United States Patent [19]

Staar

[11] Patent Number: 5,136,562
[45] Date of Patent: Aug. 4, 1992

[54] AUTOMATIC CHANGER FOR INFORMATION STORAGE DEVICES

[75] Inventor: Marcel Staar, Brussels, Belgium

[73] Assignee: Staar Development, S.A., Belgium

[21] Appl. No.: 507,482

[22] Filed: Apr. 11, 1990

[30] Foreign Application Priority Data

Apr. 11, 1989 [BE] Belgium ............................ 08900402

[51] Int. Cl.5 ...................... G11B 17/22; G11B 23/03
[52] U.S. Cl. ........................................ 369/36; 369/34;
369/194; 360/98.01; 360/98.04
[58] Field of Search .................... 369/34, 75.1, 75.2,
369/77.1, 178, 179, 191, 194, 30, 36; 360/133,
98.01, 98.04, 99.02, 99.03

[56] References Cited

U.S. PATENT DOCUMENTS

| | | |
|---|---|---|
| 1,303,299 | 5/1919 | Hahl . |
| 3,043,447 | 7/1962 | Lauck et al. . |
| 3,264,003 | 8/1966 | Thevenaz ........................ 369/75.2 |
| 3,322,108 | 5/1967 | Hoag . |
| 3,946,865 | 3/1976 | Bierwas . |
| 4,159,783 | 7/1979 | Crasnianski . |
| 4,176,762 | 12/1979 | Scalera et al. . |
| 4,331,242 | 5/1982 | Scott . |
| 4,519,522 | 5/1985 | McElwee . |
| 4,527,262 | 6/1985 | Manto ............................ 369/34 |
| 4,580,254 | 4/1986 | Hojyo ............................ 369/34 |
| 4,589,101 | 5/1986 | Schatteman et al. . |
| 4,609,232 | 9/1986 | Florence . |
| 4,644,427 | 2/1987 | Ashby ........................... 369/194 |
| 4,657,158 | 4/1987 | Faes et al. . |
| 4,664,454 | 5/1987 | Schatteman et al. . |
| 4,675,755 | 6/1987 | Baumeister .................... 369/34 |
| 4,734,814 | 3/1988 | Fujino ........................... 369/194 |
| 4,752,920 | 6/1988 | d'Alayer ........................ 369/34 |
| 4,792,865 | 12/1988 | Baumeister .................... 369/34 |
| 4,918,548 | 4/1990 | O'Donnell ..................... 360/92 |

FOREIGN PATENT DOCUMENTS

| | | | |
|---|---|---|---|
| 8800627 | 2/1990 | Belgium . | |
| 0254450 | 12/1985 | Japan ........................... | 369/75.1 |
| 0730760 | 5/1955 | United Kingdom ............ | 369/194 |
| 2159659 | 12/1985 | United Kingdom ............ | 369/178 |

OTHER PUBLICATIONS

Patent Abstracts of Japan, vol. 012, No. 046 (P-665) 12 Feb. 1988, & JP-A-62 192064 (Sony Corp) 22 Aug. 1987.
Patent Abstracts of Japan, vol. 12, No. 107 (P-686) (2954) 7 Apr. 1988, & JP-A-62 239375 (Mitsubishi Electric Corp) 20 Oct. 1987.

*Primary Examiner*—Stuart S. Levy
*Assistant Examiner*—Joseph A. Rhoa
*Attorney, Agent, or Firm*—Leydig, Voit & Mayer

[57] ABSTRACT

A changing apparatus for compact discs has a box-shaped magazine in which discs are stored in parallel, overlapping, sloped compartments. The discs can be moved from a storage position in the magazine to a playback position on a playback mechanism by a disc transfer mechanism. The disc transfer mechanism can include a spring-operated lever for pushing a disc out of the magazine. Alternatively, it may include a flexible ribbon housed inside a hollow sheath. When the ribbon is moved back and forth in the sheath, the disc is pushed in a desired direction by one of the ends of the ribbon.

20 Claims, 7 Drawing Sheets

AUTOMATIC CHANGER FOR INFORMATION STORAGE DEVICES

BACKGROUND OF THE INVENTION

This invention relates to an automatic changing apparatus for information storage devices such as compact discs, phonograph records, cassette tapes, and floppy discs. Although an apparatus in accordance with the present invention can be used with a variety of storage devices, it is particularly suitable for handling disc-shaped objects, and so for simplicity, it will be referred to as a "disc changer".

A disc changer is an apparatus which can automatically transfer an information storage device, such as a compact disc, between a storage position and a playback position in which information can be transferred to or from the information storage device. In the past, disc changers were very large devices, such as juke boxes, which were intended for installation in a single location. However, with the development of extremely lightweight compact disc players which can be easily transported, there is now a market for a lightweight, portable disc changer, and particularly for one which is extremely flat.

SUMMARY OF THE INVENTION

It is therefore an object of the present invention to provide a disc changer which is lightweight and flat.

It is another object of the present invention to provide a disc changer which is reliable and economical to manufacture.

It is a further object of the present invention to provide a disc changer which enables the discs or other information storage devices which are handled by the disc changer to be easily identified and selected.

It is yet another object of the present invention to provide a disc changer which can handle discs gently.

It is still another object of the present invention to provide a disc changer in which the discs or other media can be stored in an interchangeable magazine.

It is another object of the present invention to provide a disc changer which can be easily transported.

A disc changer in accordance with the present invention is equipped with a storage magazine for storing a plurality of discs. The magazine has compartments in which the discs are maintained in alignment in parallel and partially overlapping one another. An information transfer device can be moved relative to the magazine into alignment with any one of the discs in the magazine. A disc loading device can transfer a disc from a storage position in the magazine to a playback position in the vicinity of the information transfer device.

In one form of the present invention, the disc loading device includes a lever pivotably mounted in a compartment of the magazine. The lever can pivot to move a disc from the compartment to the playback position. The loading mechanism may also include a lever for pushing the disc from the playback position back into the compartment.

According to another form of the present invention, the disc loading device may comprise a hollow sheath and a ribbon which is disposed inside the sheath The ribbon has two ends which confront a disc from opposite sides When the ribbon is moved back and forth inside the sheath, one of the ends of the ribbon pushes the disc between the storage position and the playback position.

Preferably, the magazine can be removed from the disc changer.

As the discs are stored in overlapping, parallel planes, they take up very little space, and the entire apparatus can be extremely flat and compact.

BRIEF DESCRIPTION OF THE DRAWINGS

FIGS. 6(a-c) illustrate an example of a disc guide which can be employed in the present invention.

DESCRIPTION OF THE PREFERRED EMBODIMENTS

Figure 1:
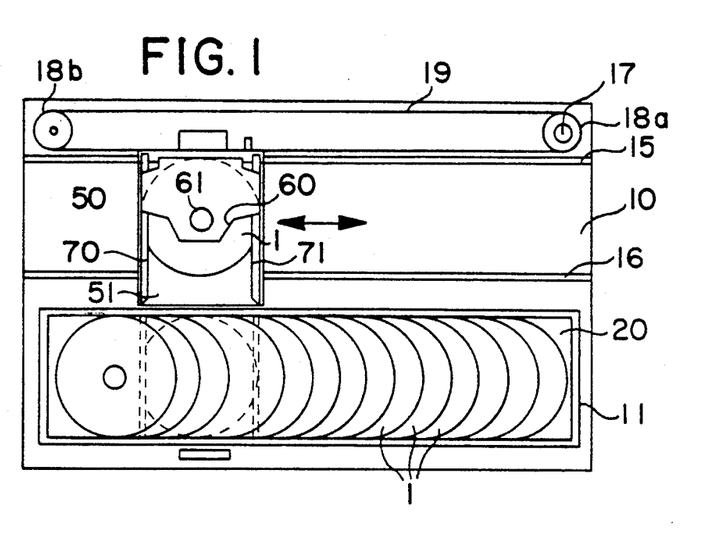
FIG. 1 is a plan view of an embodiment of a changing apparatus in accordance with the present invention.

A number of preferred embodiments of the present invention will now be described while referring to the accompanying drawings. FIG. 1 is a plan view of a first embodiment, which is in the form of a disc changer for compact discs. However, as mentioned above, the present invention is not restricted to use with compact discs but can be used with a wide variety of information storage devices, including phonograph records, floppy discs, and cassette tapes. As shown in this figure, the disc changer has a hollow, box-shaped housing 10, the top surface of which has been omitted from FIG. 1 for clarity. The upper surface of the housing 10 has a rectangular recess 11 formed therein, and a removable, rectangular magazine 20 for compact discs 1 is disposed inside the recess 11. Two parallel guide rails 15 and 16 are mounted inside the housing 10 parallel to the magazine 20. A movable carriage 50 is mounted atop the rails 15 and 16 for horizontal movement. The carriage 50 can be moved incrementally along the rails 15 and 16 by a step motor 17 which is mounted inside the housing 10 near one end thereof. A first pulley 18a is secured to an output shaft of the step motor 17, and a second pulley 18b is rotatably mounted inside the housing 10 near the opposite side thereof. A belt 19 is wrapped around the two pulleys 18a and 18b and is connected to the carriage 50 so that when the step motor 17 is rotated, the belt 19 will cause the carriage 50 to move longitudinally along the rails 15 and 16.

The carriage 50 supports an information transfer device in the form of a conventional optical pickup and a drive motor for rotating a disc 1 while information is being read from it by the pickup. In the present embodiment, the information transfer device is only capable of reproducing information, but it may instead be a device for recording or both reproducing and recording information. The carriage 50 includes a pivotably mounted clamp 60 for restraining a disc 1 at its center as it is being rotated by the drive motor. A disc guide 70 is also pivotably mounted on the carriage 50. The disc guide 70 guides and supports a disc 1 as it is being transferred to or from the magazine 20. It includes a pair of parallel guide rails 71 separated from one another by a distance corresponding to the diameter of a disc 1.

Figure 2:
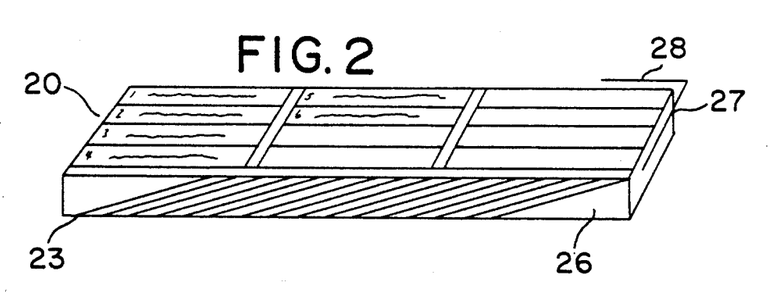
FIG. 2 is a perspective view of the magazine of the embodiment of FIG. 1.

FIG. 2 is a perspective view of the magazine 20 when removed from the housing 10. In accordance with the invention, the magazine 20 has a plurality of compartments 23 for storing compact discs 1 in parallel planes which are somewhat sloped with respect to the plane of the top or bottom surfaces of the magazine 20. The discs 1 are maintained parallel and in alignment with one another, and each disc 1 overlaps the adjacent disc 1. Identifying labels for identifying the discs 1 which are stored in the magazine 20 can be attached to the top surface of the magazine 20. The compartments 23 can be identified by numbers or letters so that a user can indicate the disc 1 which he wishes to play by inputting the number or letter into an unillustrated input device, such as a keypad. In carrying out the invention, the carriage 50 and the rails 71 of the disc guide 70 are slightly sloped with respect to the horizontal by the same angle as are the compartments 23 in the magazine 20 so as to be always parallel to the planes of the discs 1 in the magazine 20.

Figure 3:
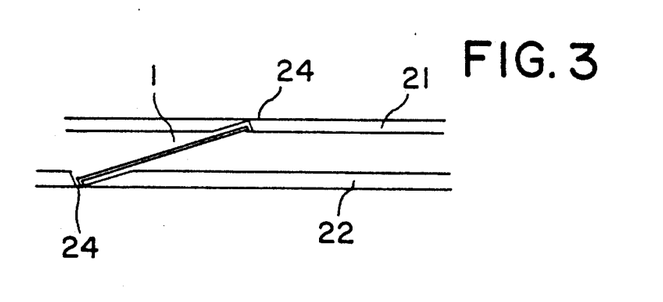
FIG. 3 is an end view of the magazine of FIG. 2.

The magazine 20 includes an upper rectangular plate 21 and a lower rectangular plate 22 which form the top and bottom sides of the magazine 20. In keeping with the invention, discs 1 are supported inside the magazine 20 by a plurality of parallel grooves 24 formed in the inner surface of the top plate 21 and an equal number of parallel grooves 24 formed in the inner surface of the lower plate 22. The sides of the grooves 24 are sloped with respect to the top and bottom surfaces of the magazine 20 so as to support the discs 1 in sloping planes. A pair of grooves 24 and the space therebetween define a single compartment 23 for a disc 1. The front side 26 and the rear side 27 of the magazine 20 can be completely open, or they can be covered by plates having slots formed therein corresponding to the compartments 23 in the magazine 20.

Figure 4:
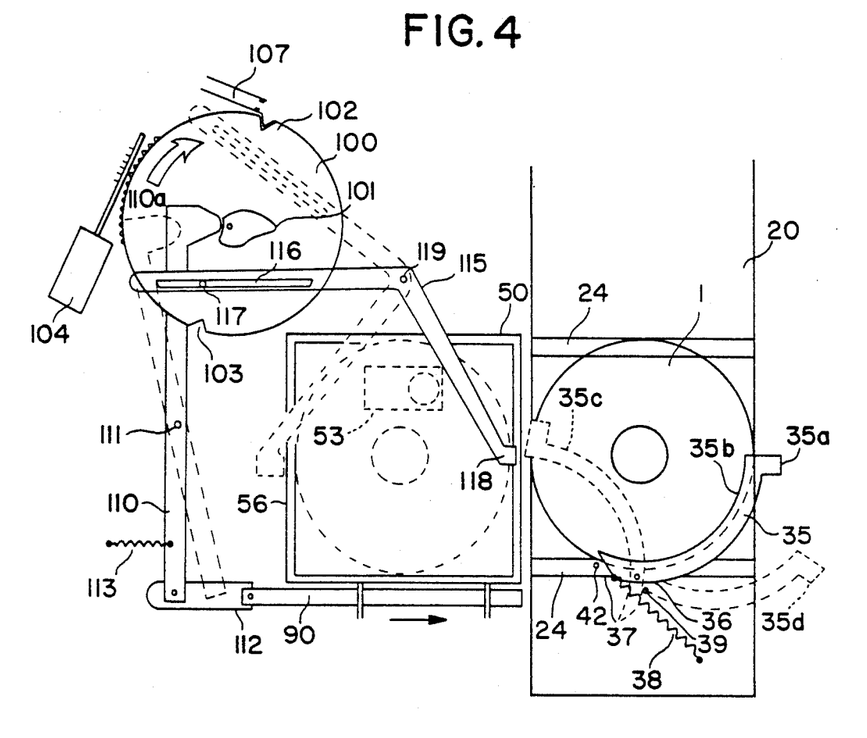
FIG. 4 is a schematic plan view of a disc loading mechanism which can be employed in the present invention.
Figure 5:
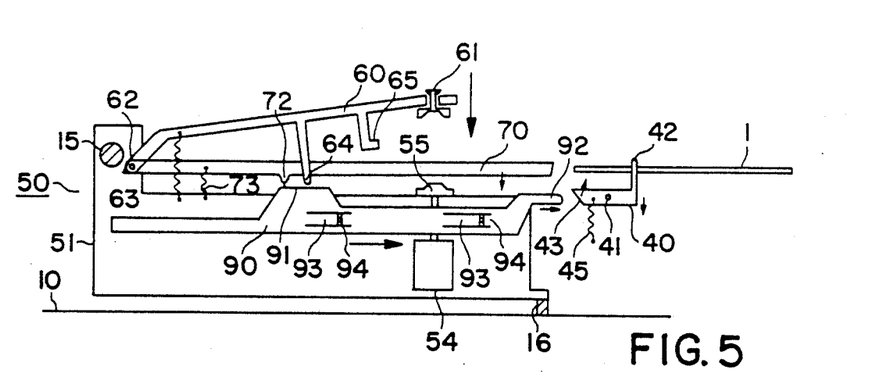
FIG. 5 is a schematic side elevation of the disc loading mechanism of FIG. 4.

FIG. 4 is a schematic plan view and FIG. 5 is a schematic side elevation of the carriage 50 and an example of a disc loading device for transferring a disc 1 between the magazine 20 and the carriage 50. The carriage 50 includes a base 51 which houses an optical pickup 53 and a drive motor 54 for rotating a disc 1. Generally, the drive motor 54 and the optical pickup 53 can be purchased as a single unit for mounting inside the base 51. A capstan 55 is mounted on a spindle rotated by the drive motor 54. The rear end of the base 51 (the left end in FIG. 4) is slidably mounted on rail 15 which passes through a hole in the base 51, while the front end of the base 51 is slidably supported by rail 16. The clamp 60 and the disc guide 70 are pivotably mounted on a shaft 62 at the rear portion of the base 51. The clamp 60 rotatably supports a disc restraint 61 which restrains the upper surface of a disc 1 as it rotates. The clamp 60 can pivot between an open position shown in FIG. 5 in which the disc restraint 61 is separated from the capstan 55 and a closed position in which the disc restraint 61 presses a disc 1 against the capstan 55. The clamp 60 is biased in the clockwise direction in FIG. 5, i.e., towards its closed position, by a spring 63 connected between the clamp 60 and the base 51. The disc restraint 61 may be magnetized to increase the force pressing it against the capstan 55 when the clamp 60 is in its closed position The disc guide 70 can pivot about shaft 62 between a raised position and a lowered position In the raised position, shown in FIG. 5, the rails 71 of the disc guide 70 are aligned with the grooves 24 of one of the compartments 23 of the magazine, and a disc 1 held by the guide 70 is raised above the capstan 55. In the lowered position, a disc 1 held by the rails 71 is seated on the capstan 55. The disc guide 70 is biased towards its lowered position by a spring 73 connected between the base 51 and the disc guide 70.

A disc 1 can be moved from a playback position on the carriage 50 into the magazine by a lever 115 which is pivotably mounted on the carriage 50 on a pin 119. One end 118 of the lever 115 has a groove formed therein which can fit over the edge of a disc 1 to support the disc 1. The other end of the lever 115 is linked with a rotatable turntable 100 by a pin 117 secured to the turntable 100 and extending through an elongated slot 116 formed in the lever 115. The turntable 100 is rotatably mounted on a suitable portion of the carriage 50. For clarity, the turntable 100 is shown in FIG. 4 next to the base 51 of the carriage 50. However, for compactness, the turntable 100 may be mounted on the underside of the carriage 50. The turntable 100 can be rotated by a motor 104 connected to the turntable 100 by any suitable means, such as the worm and rack shown in FIG. 4 or by a belt and pulley arrangement.

When the turntable 100 is rotated by a half cycle, the lever 115 is pivoted from the position shown by the solid lines to the position shown by the dashed lines in FIG. 4. When the turntable 100 is rotated by an additional half cycle, the lever 115 is pivoted back to the position shown by the solid lines and in the process pushes a disc 1 into the magazine 20.

A rigid bar 90 is slidably mounted on a lateral surface of the base 51 of the carriage 50 for horizontal movement. In the illustrated embodiment, the sliding bar 90 includes slots 93 which fit over pins 94 extending horizontally from the side of the base 51. The bar 90 has a cam 91 formed on its upper surface for raising and lowering the clamp 60 and the disc guide 70. The clamp 60 and the disc guide 70 are equipped with projections 64 and 72, respectively, which are in sliding contact with the cam 91. As the bar 90 is moved to the left and right in FIG. 5, the clamp 60 and the disc guide 70 are raised and lowered by the force exerted by the cam 91 on the projections 64 and 72. The projection 72 for the disc guide 70 is disposed to the rear of the projection 64 for the clamp 60 so that the clamp 60 will be opened before the disc guide 70 is raised and will be closed after the disc guide 70 is lowered.

The sliding bar 90 is moved to the left and right in FIGS. 4 and 5 by a lever 110 which is pivotably mounted a pin 111 on a suitable portion of the carriage 50. One end of the lever 110 is connected to the sliding bar 90 by a link 112, while the other end 110a of the lever 110 contacts a rotating cam 101 which is secured to one side of the turntable 100 so as to rotate therewith. The lever 110 is biased in the clockwise direction in FIG. 4 by a spring 113 so as to force the end 110a of the lever 110 against the cam 110. The rotation of the cam 101 causes the lever 110 to pivot between the position shown by the solid lines in FIG. 4 to the position shown by the dashed lines.

The turntable 100 has two diametrically opposed notches 102 and 103 formed in its circumference. A switch 107 is disposed adjacent to the turntable 100 and engages the circumference of the turntable 100 so as to open each time it comes into contact with one of the notches 102 and 103. The switch 107 is connected to an unillustrated circuit which supplies current to the motor 104 whenever switch 107 is closed.

In this embodiment, each of the compartments 23 in the magazine 20 is equipped with a spring-operated lever 35 for loading a disc 1 from the magazine 20 onto the carriage 50. Each lever 35, only one of which is shown, has an arcuate shape and includes a circumferentially-extending groove 35b for holding the peripheral edge of a disc 1. The lever 35 is pivotally mounted on the magazine 20 at point 36. It is biased in the counterclockwise direction in FIG. 4 by a spring 38. When holding a disc 1 in the magazine 20, the lever 35 assumes the position shown by the solid lines in the figure. When the disc 1 has been loaded onto the carriage 50, the lever 35 pivots counterclockwise in the figure to the position 35c shown by dashed lines until the outer periphery of the lever 35 abuts a pin 39 secured to the magazine 20. When a disc 1 is to be removed from or inserted into the magazine 20, the lever 35 can be manually pivoted clockwise in the figure to a position 35d shown by dashed lines by pulling on a tab 35a formed on one end of the lever 35.

Each compartment 23 of the magazine 20 is also equipped with a rocker arm 40 which is pivotally mounted on the magazine 20 at point 41. A latch pin 42 is formed on one end of the rocker arm 40, and a cam surface 43 is formed on the other end. The rocker arm 40 can pivot between a locked position, shown in FIG. 5, in which the latch pin 42 extends into the path of movement of the disc 1, and an unillustrated unlocked position in which the latch pin 42 is withdrawn from the path of movement. The rocker arm 40 is biased towards the locked position by a spring 45. When the rocker arm 42 is in the locked position, the latch pin 42 contacts the peripheral edge of the disc 1 and prevents it from being pushed onto the carriage 50 by the lever 35. When it pivots to the unlocked position, the latch pin 42 does not impede the disc 1, so the disc 1 is forced out of the compartment 23 onto the carriage 50 to a playback position shown by dashed lines in FIG. 4. The disc 1 is prevented from moving too far to the left in FIG. 4 by a pin 56 which is mounted on the rear of the carriage 50. When a compartment 23 is empty, the cam surface 37 of the lever 35 contacts the latch pin 42, so the lever 35 is maintained in the position shown by the solid lines in FIG. 4 in which the tab 35a can be easily grasped.

The rocker arm 40 can be moved from the locked position to the unlocked position by a projection 92 disposed on the front end of the sliding bar 90. When the sliding bar 90 is moved to the right from the position shown in FIG. 5, the projection 92 contacts the cam surface 43 of the rocker arm 40 and pivots the rocker arm 40 clockwise to the unlocked position. When the sliding bar 90 is moved back to the left in FIG. 5, the projection 92 is retracted, and the spring 45 pulls the rocker arm 40 back to the locked position. The length of the projection 92 is chosen so that when the bar 90 is moved to the right in FIG. 5, the projection 92 will contact the rocker arm 40 and cause it to pivot while the clamp 60 and the disc guide 70 are still held in a raised position by the cam 91 of the sliding bar 90.

In this embodiment, the force for moving a disc 1 from the magazine 20 to the carriage 50 is provided entirely by spring 38. However, it is possible to mount an actuator pin on the sliding bar 90 which contacts the lever 35 when the bar 90 is moved to the right in FIG. 5 and exerts a torque on the lever 35 to help pivot it in the counterclockwise direction. Such an arrangement would allow spring 38 to be decreased in strength, thereby making it easier for a disc 1 to be moved by lever 115 back into the magazine 20.

Figure 9:
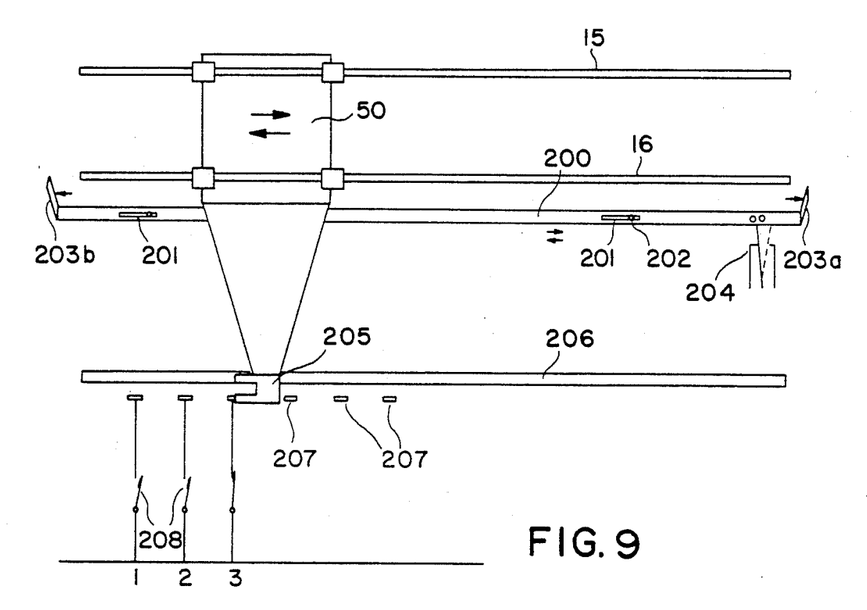
FIG. 9 is a schematic plan view of the carriage of the embodiment of FIG. 1 and a portion of an arrangement for controlling the movement of the carriage.

FIG. 9 is a plan view of an example of an arrangement for controlling the location of the carriage 50 along the rails 15 and 16. As shown in FIG. 9, a rigid bar 200 having longitudinal slots 201 formed therein is slidably mounted on pins 202 that extend upwards from the bottom of the housing 10. The bar 200 can slide to the left and right on the pins 202 by the length of the slots 201. Flanges 203a and 203b are mounted on both ends of the bar 200 and extend upwards into the path of movement of the carriage 50. The bar 200 is connected to the free end of a double-throw switch 204 so that longitudinal movement of the bar 200 operates the switch 204. The switch 204 is connected to the step motor 17 for moving the carriage 50 by an unillustrated circuit so as to control the polarity of the current supplied to the step motor 17. Each time the carriage 50 strikes one of the flanges 203a or 203b, the setting of the switch 204 is changed, thereby reversing the polarity of the motor current and the direction of rotation of the motor 17 to move the carriage 50 in the opposite direction.

For example, if the carriage 50 is traveling to the right in FIG. 9, when it strikes flange 203a, the bar 200 is moved slightly to the right, and the switch 204 is changed from the position shown by the solid line to the position shown by the dashed line in FIG. 9. The change in the switch position reverses the direction of rotation of the step motor 17, and the carriage 50 is then moved to the left in FIG. 9 until it strikes the other flange 203b.

A bus bar 206 and a plurality of stationary electrical contacts 207 are secured to the bottom of the housing 10. The bus bar 206 is connected to an unillustrated power supply. Each contact 207 is connected to a selector switch 208, each of which corresponds to one of the compartments 23 for discs 1 in the magazine 20. An electrically-conducting wiper arm 205 is secured to the carriage 50. As the carriage 50 moves along the rails 15 and 16, one portion of the wiper arm 205 slides along the bus bar 206 in constant electrical contact with it. Another portion of the wiper arm 205 touches the contacts 207 one at a time and forms a momentary electrical connection between the bus bar 206 and the contact 207 which it touches.

If the user of the disc changer wishes to select the disc 1 in compartment number three of the magazine 20, he closes the corresponding switch 208. When the wiper arm 205 reaches the contact 207 which is connected to this switch 208, current flows between from the bus bar 206 and through the contact 207 and the closed switch 208. This current can be used as a signal to turn off the step motor 17 so that the disc guide 70 of the carriage 50 will be exactly aligned with the grooves 24 of the third compartment. It can also be used to provide an impulse to motor 104 for rotating the turntable 100.

Figure 10:
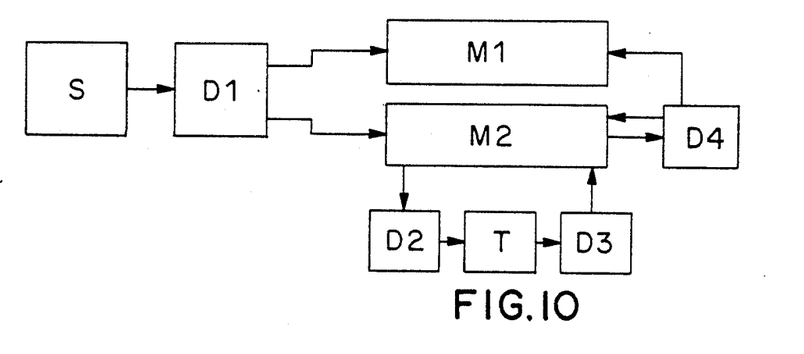
FIG. 10 is a block diagram of a controller for the embodiment of FIG. 1.

FIG. 10 schematically illustrates a mechanism for controlling the operation of the disc changer. A selector S, which can be in the form of the switches 208, cooperates with a first position detector D1, which can be in the form of the wiper arm 205, the bus bar 206, and the contacts 208. The position detector D1 generates an output signal which stops a first motor M1 (the step motor 17) for moving the carriage 50, and another output signal which starts a second motor M2 (motor 104) for driving the turntable 100 when the carriage 50 reaches a desired location. The movement of a disc 1 from the magazine 20 to the carriage 50 is detected by a second position detector D2, which generates a signal which activates the capstan drive motor 54 and the optical pickup 53 and starts the reproduction of the information stored on the disc 1. The second position detector D2 can be constituted by switch 107 and notch 103 in the turntable 100.

The end of reproduction of information is detected by a third position detector D3, which generates an output signal to operate the second motor M2 (motor 104) for driving the turntable 100 to return a disc 1 to the magazine 20. The third position detector D3 is generally built into the unit containing the drive motor 54 and the optical pickup 53. A fourth position detector D4, which can be in the form of switch 107 and notch 102 in the turntable 100, detects when the disc 1 has been returned to the magazine 20 and generates output signals which stop the second motor M2 (motor 104) for the turntable 100 and activates the first motor M1 (step motor 17) to once again move the carriage 50 along the rails 15 and 16.

By means of the arrangement shown in FIG. 10, the disc changer can automatically remove a desired disc 1 from the magazine 20, play the disc 1, and then return the disc 1 to the magazine 20.

The operation of the embodiment of FIG. 4 will now be described. It will be assumed that a disc 1 is initially housed in the magazine 20 with the carriage 50 disposed opposite the disc 1, as shown by the solid lines in the figure. When a sensor (such as the sensor S of FIG. 10) detects that the carriage 50 is located directly in front of a disc 1 to be played, the motor 104 is given an impulse to slightly rotate the turntable 100 in the clockwise direction. The initial rotation of the turntable 100 causes switch 107 to disengage from notch 102 and close, thereby supplying current to drive the motor 104 and rotate the turntable 100. The rotation of the turntable 100 causes the cam 101 to rotate and to pivot lever 110 counterclockwise, and the sliding bar 90 is thereby moved to the right in FIG. 4. As the bar 90 moves to the right, the projection 92 contacts the cam surface 43 of the rocker arm 40, and the rocker arm 40 is pivoted to the unlocked position in which the latch pin 42 is retracted from the path of movement of the disc 1. When the latch pin 42 is retracted, the force of spring 38 causes lever 35 to push the disc 1 against the end 118 of lever 115. As the turntable 100 continues to rotate, lever 115 is pivoted clockwise in FIG. 4, and the disc 1 is pushed into the rails 71 of the disc guide 70, with one side of the disc 1 grasped by lever 35 and the other side of the disc 1 contacting the end 118 of lever 115. When the disc 1 reaches the playback position atop the carriage 50 shown by the dashed lines, the sliding bar 90 is moved further to the right, causing projection 72 and then projection 64 to slide down the cam 91. As a result, the disc guide 70 and then the clamp 60 are pivoted clockwise to a lowered position in which the disc 1 is held atop the spindle 55 by the clamp 60. At this point, notch 103 reaches a position opposite switch 107, and switch 107 opens to cut off the current to motor 104 and stop the rotation of the turntable 100. Current is then supplied to the capstan drive motor 54 to rotate the disc 1, and the optical pickup 53 begins to transfer information from the disc 1. When the transfer of information has been completed or when the user of the apparatus presses an unillustrated reject button, an impulse is applied to motor 104, switch 107 is closed, and the turntable 100 is once again rotated by a half cycle until notch 102 engages with switch 107. As the turntable 100 rotates, lever 115 is pivoted from the position shown by the dashed lines to the position shown by the solid lines, and the end 118 of lever 115 pushes the disc 1 back into the compartment 23 in the magazine 20. The rightward movement of the disc 1 pivots lever 35 clockwise to the position shown by the solid lines in FIG. 4.

As lever 115 pivots counterclockwise in FIG. 4, lever 110 pivots clockwise from the position shown by the dashed lines to the position shown by the solid lines. As it does so, it moves the sliding bar 90 to the left in FIG. 5. The leftward movement of the bar 90 first raises the clamp 60 to release the disc 1 and then raises the disc guide 70 to raise the disc 1 off the capstan 55.

When the disc 1 has been moved by lever 115 to beyond the latch pin 42, the projection 92 of the sliding bar 90 disengages from the cam surface 43 of the rocker arm 40, and the rocker arm 40 pivots to its locked position to hold the disc 1 in place in the compartment 23, with the disc 1 pushed against the latch pin 42 by lever 35. The carriage 50 can then be moved to another location to access another disc 1.

Figure 6A:
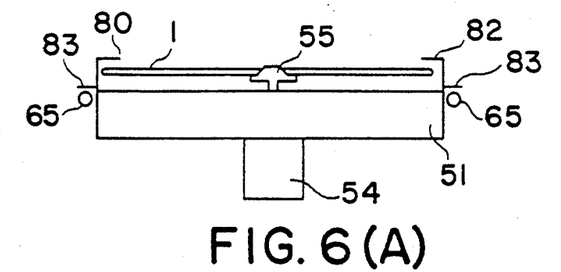
Figure 6B:
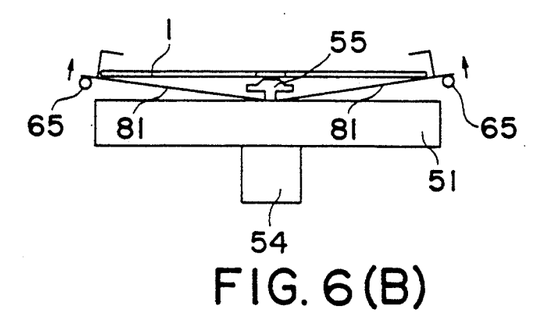
Figure 6C:
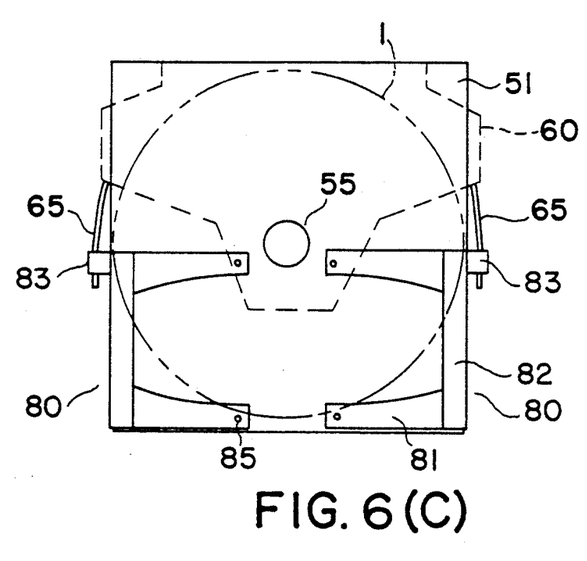

FIG. 6 illustrates another example of disc guides 80 for guiding the movement of a disc 1 onto the carriage 50. FIG. 6A is a schematic front elevation of the carriage 50 when the disc guides 80 are in a lowered position, FIG. 6B is a schematic front elevation of the carriage 50 when the disc guides 80 are in a raised position, and FIG. 6C is a schematic plan view of the carriage 50 and the guides 80. Each guide 80 is a generally U-shaped member having a flexible, U-shaped lower plate 81 and an L-shaped flange 82 extending upward from the lower plate 81. The lower plates 81 are disposed on the base 51 of the carriage 50 with their leg sections facing one another. The flanges 82 are parallel to the grooves 24 in the magazine 20. The ends of the leg sections of the lower plates 81 are secured to the base 51 by screws 85, while the outer portions of the lower plates 81 are free to move upwards from the base 51. Each guide 80 is equipped with a tab 83 extending laterally outwards from the flanges 82. A lift arm 65 extends from each side of the clamp 60 to beneath one of the tabs 83, as shown in FIG. 6A. When the clamp 60 pivots from a closed position to an open position, the arms 65 move upwards and lift the outer sides of the guides 80 off the base 51 83. The upward movement of the guides 80 lifts a disc 1 off the capstan 55, and in this raised position, the disc 1 can be removed from the carriage 50 by lever 115. When the clamp 60 returns to its closed position, the elasticity of the lower plates 81 of the disc guides 80 returns them to the lowered position of FIG. 6A.

In the embodiment of FIG. 4, lever 35 is employed to move a disc 1 from the magazine 20 to the carriage 50, and another lever 115 is employed to move the disc 1 back into the magazine 20. However, if one of the levers is equipped with a clamp which can releasably grasp the edge of a disc 1 instead of just pushing the disc 1, a single lever can be used to transfer a disc 1 both to and from the magazine 20.

Figure 7:
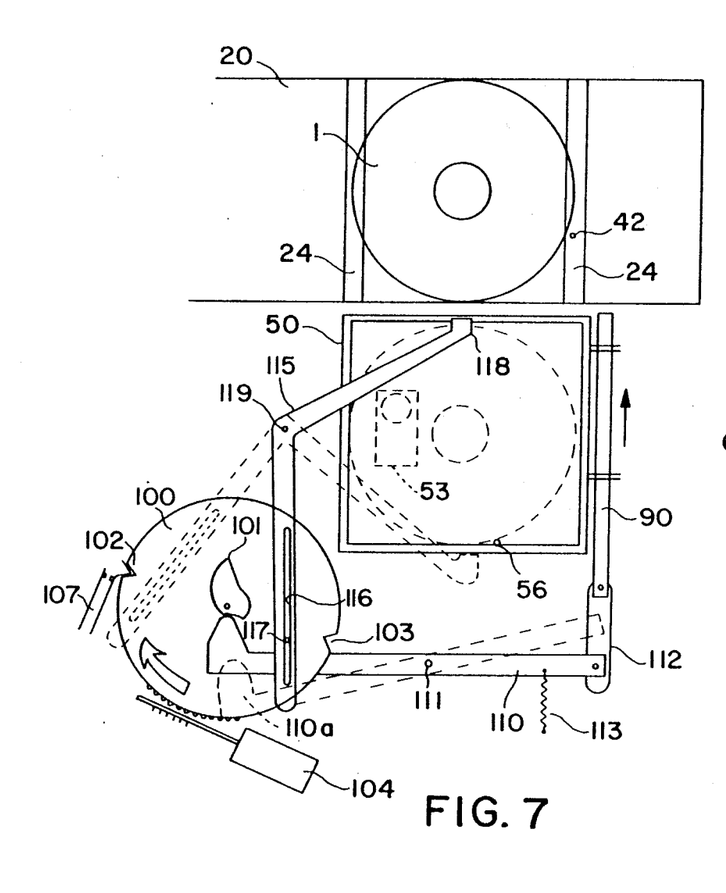
FIG. 7 is a schematic front elevation of an embodiment of the present invention for mounting on a wall.
Figure 8:
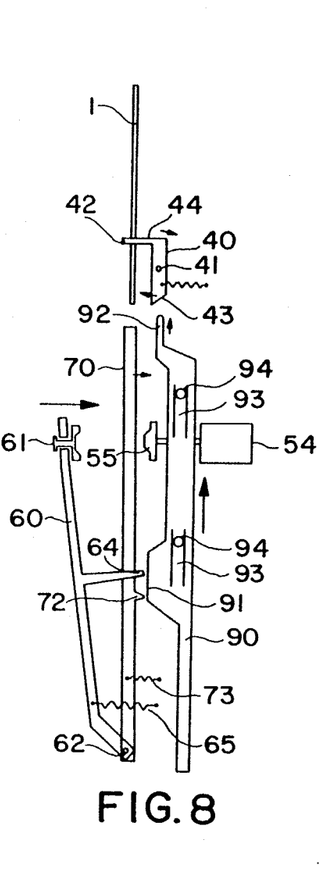
FIG. 8 is a schematic side elevation of the embodiment of FIG. 7.

FIGS. 7 and 8 illustrate another embodiment of the present invention which is designed to be mounted on a vertical surface, such as on a wall. FIG. 7 is a schematic front elevation of this embodiment, and FIG. 8 is a schematic side elevation. The structure of this embodiment is similar to that of the embodiment of FIGS. 4 and 5. However, in carrying out the invention, in this embodiment, the magazine 20 is disposed at a higher level than the carriage 50, so gravity can be utilized to transfer a disc 1 from the magazine 20 to the carriage 50. Therefore, this embodiment is not equipped with levers 35 for pushing discs 1 out of the slots 23 and has a simpler structure than the embodiment of FIG. 4. When the sliding rod 90 moves upwards in FIG. 8, the projection 92 contacts the cam surface 43 of the rocker arm 40 and pivots the rocker arm 40 from the locked position to the unlocked position. In the unlocked position, the latch pin 42 moves out of the path of the disc 1, and the disc 1 falls onto the groove in end 118 of lever 115, which lowers the disc 1 onto the carriage 50. The operation of this embodiment is otherwise the same as that of the embodiment of FIG. 4.

Figure 11:
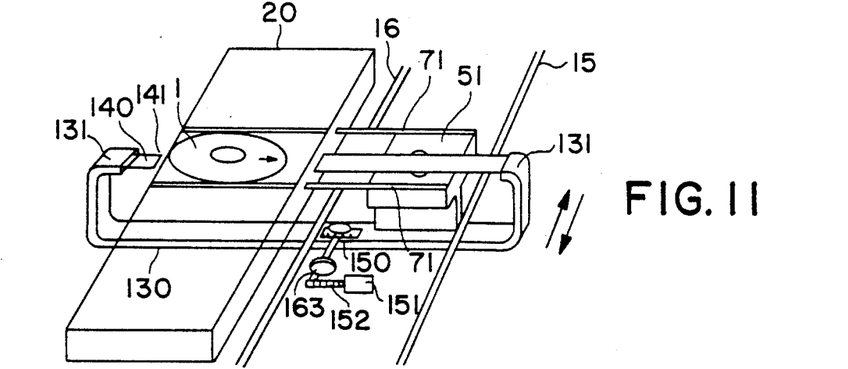
FIG. 11 is a perspective view of another embodiment of a disc loading mechanism.
Figure 12:
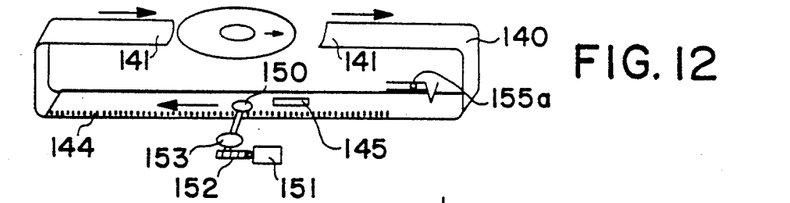
FIG. 12 is a perspective view of the disc loading mechanism of FIG. 11 with the magazine and sheath removed, showing it as it transports a disc towards the playback position.
Figure 13:
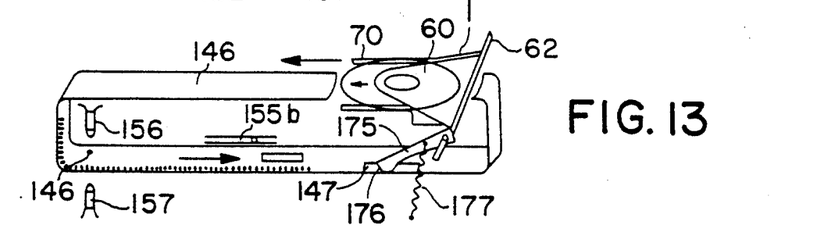
FIG. 13 is a perspective view of the disc loading mechanism, showing a locking mechanism for holding a disc atop the carriage.

FIGS. 11 through 13 are perspective views of another example of a disc loading mechanism for moving a disc 1 between a storage position in the magazine 20 and a playback position on the carriage 50. In this form of the invention, it includes a hollow sheath 130 and a flexible ribbon 140 which is disposed inside the sheath 130 and is able to slide back and forth inside it. The exact shape of the sheath 130 is not critical, but in the present embodiment, it is generally C-shaped and has two ends 131 which confront the front and rear sides of the magazine 20. The sheath 130 is secured to the carriage 50 so as to move with it along the rails 15 and 16. The ribbon 140 has two ends 141 which are separated by a gap which is somewhat larger than the diameter of a disc 1. The two ends 141 confront a disc 1 from opposite sides. The ends 141 can be made thicker than the other portions of the ribbon 140 to give them a greater stiffness, or a reinforcing member can be attached to the ends 141 for the same purpose. The ribbon 140 is made of a material which can be deformed in its widthwise direction so as to have either a flat shape, which can be easily bent in the lengthwise direction, or a curved shape which can resist axial loads without buckling. The portions of the ribbon 140 which are inside the sheath 130 assume the flat shape, while the portions which are outside of the sheath 130 assume the curved shape. One way of causing a change in the widthwise shape of the ribbon 140 is to permanently impart a curved widthwise shape to the ribbon 140 so that when no restraining force acts thereon, i.e., when it extends outside of the sheath 130, it will naturally assume a curved shape. Another method is to permanently impart a flat widthwise shape to the ribbon 140 and to curve the ends 131 of the sheath 130 so that when the ribbon 140 leaves the sheath 130, the ribbon 140 will be bent to conform to the shape of the ends 131.

Some examples of materials which are suitable for the ribbon 140 are tempered steel and plastics having good elasticity.

Figure 16:
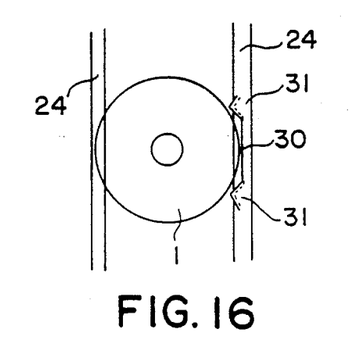
FIG. 16 is a plan view of a disc housed inside the magazine of the embodiment of FIG. 11.

As shown in FIG. 16, which is a plan view of one of the compartments 23 of the magazine 20, in this embodiment one or both of the grooves 24 of each compartment 23 has a leaf spring 30 secured to the inside thereof. The leaf spring 30 has fingers 31 formed at the ends thereof which can grasp the edge of a disc 1. The leaf spring 30 properly positions a disc 1 in the magazine 20 and holds it in the proper attitude. It also prevents the disc 1 from falling out of the magazine 20 when it is being moved or tilted, such as when the magazine 20 is removed from the housing 10. However, the leaf spring 30 is sufficiently flexible to allow a disc 1 to be manually slipped into one of the compartments of the magazine 20 through the front or rear sides of the magazine 20.

Figure 17:
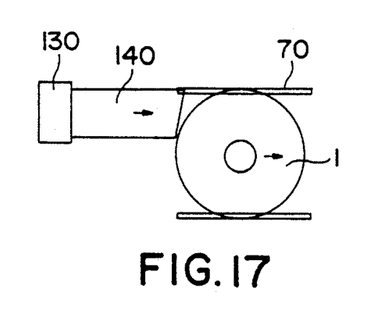
FIG. 17 is a plan view of a disc inside the magazine of the embodiment of FIG. 11, showing how the ribbon is guided by the grooves in the magazine.
Figure 18:
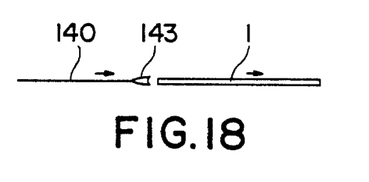
FIG. 18 is a side view of a disc and a ribbon equipped with an end piece for contacting the edge of the disc.

As shown in FIG. 17, the sheath 130 can be positioned so that one side of the ribbon 140 is guided by one of the grooves 24 in the magazine 20 when the ribbon 140 is moved back and forth. As shown in FIG. 18, a guide member 143 having a concave surface can be secured to the ends 141 of the ribbon 140 to help center the ends of the ribbon 140 on the edge of a disc 1.

FIG. 12 shows an example of a mechanism for moving the ribbon 140 back and forth inside the sheath 130. The ribbon 140 has a plurality of holes 144 formed in one surface thereof for a portion of its length. These holes 144 mesh with the teeth of a pinion 150 through a hole formed in the sheath 130 so that the rotation of the pinion 150 causes the ribbon 140 to slide in its lengthwise direction inside the sheath 130. The pinion 150 is coaxially secured to a wormwheel 153, which meshes with a worm 152 which is secured to the output shaft of an electric motor 151. When the motor 151 is rotated in one direction, the ribbon 140 is moved so that its left end 141 pushes the disc 1 to the right in FIG. 12, and when the motor 151 is rotated in the opposite direction, the ribbon 140 is moved so that its right end 141 pushes the disc 1 to the left. As the gap between the ends of the ribbon 140 is larger than the diameter of the disc 1, there is a certain amount of play in the movement of the disc 1.

The position of the ribbon 140 can be detected by means of an elongated hole 145 which is formed in the ribbon 140 and two switches 155a and 155b which are operated by engagement with the hole 145. The switches 155a and 155b each have a movable contact which is biased towards a closed position but which is normally held open by a bent portion which rests against the inner surface of the ribbon 140. When the disc 1 is in the storage position, the moving contact of switch 155a falls into the hole 145 and switch 155a closes, and when the disc 1 is in the playback position, the movable contact of switch 155b falls into the hole 145 and switch 155b closes. The switches 155a and 155b and the hole 145 constitute a position detector for the disc 1. Alternatively, a position detector can be in the form of two through holes 146 formed in the ribbon 140 which allow light to pass through the ribbon 140, a light-emitting element, such as an infrared emitter 156, which is disposed on one side of the ribbon 140, and a light-sensitive element, such as an infrared receiver 157 which is disposed on the opposite side of the ribbon 140 and which detects when one of the through holes 146 is aligned with a beam of light from the infrared emitter 156. The through holes 146 are formed in the ribbon 140 so that one of the through holes 146 will be aligned with the emitter 156 and receiver 157 when the disc 1 is in the storage position in the magazine 2, and the other though hole 146 will be similarly aligned when the disc 1 is in the playback position on the carriage 50.

FIG. 13 illustrates a locking mechanism which cooperates with the clamp 60 to hold a disc 1 atop the carriage 50. As shown in this figure, the clamp 60 is equipped with a hook 147 which can rotate about shaft 62 together with the clamp 60. The clamp 60 is biased towards the closed position by a spring 177 which is connected between the fastening hook 175 and the housing 10.

A hole 147 is formed in the ribbon 140 in a position such that it can engage with the outer end of the fastening hook 175 when a disc 1 is in the playback position. The lower end of the fastening hook 175 has a bevelled surface 176 so that the fastening hook 175 can ride smoothly over the left end of the hole 147 when the hole 147 move to the right in FIG. 13 but such that the fastening hook 147 will catch on the right side of the hole 147 when the hole 147 moves to the left in FIG. 13. When the lower end of the fastening hook 175 contacts the inner surface of the ribbon 140, the clamp 60 is pivoted away from the disc 1 by an amount sufficient to enable the disc 1 to be placed onto or removed from the carriage. In this state, the ribbon 140 can also pass between the clamp 60 and the carriage 50. When the fastening hook 175 engages with the hole 147, the clamp 60 is pivoted downwards by the tension spring 177 and retains the disc 1 atop the carriage 50.

The longitudinal dimensions of the hole 147 are chosen such that when the ribbon 140 is moved to return a disc 1 to the magazine 20, the fastening hook 175 will have disengaged from the hole 147 and pivoted the clamp 60 away from the disc 1 before the right end 141 of the ribbon 140 contacts the edge of the disc 1.

Figure 14:
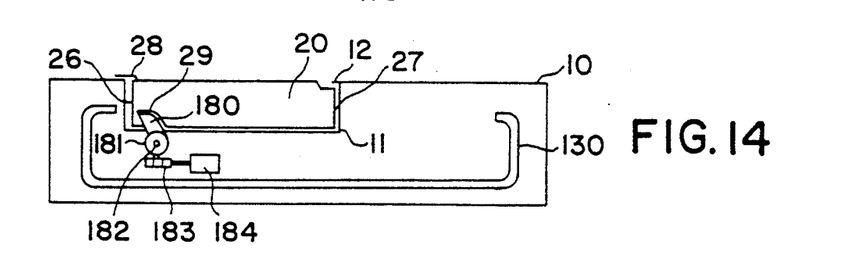
FIG. 14 is a cross-sectional view of a disc changer using the disc loading mechanism of FIG. 11.
Figure 15:
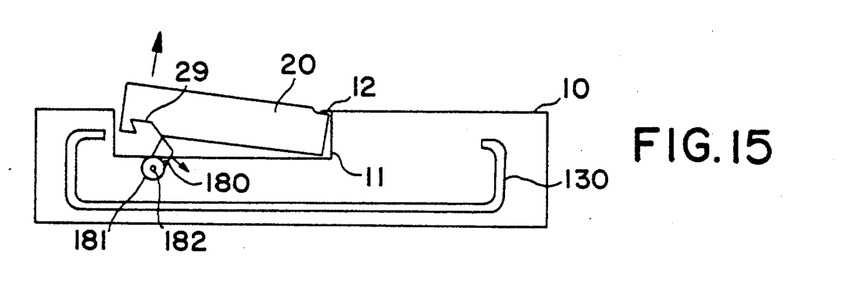
FIG. 15 is another cross-sectional view showing a magazine being ejected from the housing.

FIGS. 14 and 15 are transverse cross-sectional views showing a mechanism which can be used for locking the magazine 20 inside the housing 10. As shown in these figures, a recess 11 which is slightly larger than the magazine 20 is formed in the top surface of the housing 10. An overhanging strip 12 is secured to the top surface of the housing 10 along one side of the recess 11 so as to partially overlap the upper surface of the magazine 20 along its rear side 27. Another overhanging strip 28 is secured to the top surface of the magazine 20 and overlaps the top surface of the housing 10 along the front side 28 of the magazine 20. The overhanging strip 28 may be part of the upper panel of the magazine 20. These overhanging strips 12 and 28 prevent dust from entering the magazine 20 or the recess 11. A latch 180 is rotatably mounted on a shaft 182 and protrudes through a hole in the bottom of the recess 11. The latch 180 is secured to a gear 182 which engages with a worm 183 which is rotated by a motor 184. The latch 180 can be pivoted between a locked position shown in FIG. 14 and an unlocked position shown in FIG. 15 by the rotation of the motor 184. In the locked position, the latch 180 fits into a corresponding recess 29 formed in the bottom surface of the magazine 20 and prevents the magazine 20 from being removed from recess 11. When the latch 180 is rotated to the unlocked position, it moves out of recess 29 and releases the magazine 20. At the same time, the latch 180 acts as a cam and presses against the inner surface of recess 29, causing the magazine 20 to pivot slightly clockwise in FIG. 15. As a result, the magazine 20 is pushed far enough out of recess 11 that it can be easily grasped by the operator and removed from the recess 11. Alternatively, when the latch 180 is in the unlocked position, the magazine 20 can be made to pivot by an amount sufficient to enable an operator to replace the discs 1 in the magazine 20 without having to remove the magazine 20 from the housing 10. When the latch 180 is rotated back towards the locked position, the magazine 20 descends back into the recess 11 under the force of gravity.

The motor 184 for operating the latch 180 can be controlled by a manual switch which can be turned on only when there is no mechanical obstruction which prevents the removal of the magazine 20. For example, the manual switch can be connected with switch 155a so as to be activated when switch 155a is in a state indicating that the disc 1 is in the magazine 20.

The operation of the embodiment of FIG. 11 can be controlled by an arrangement similar to that illustrated in FIGS. 9 and 10. When the circuit of FIG. 10 is applied to the embodiment of FIG. 11, the first motor M1 comprises the step motor 17 and the second motor M2 comprises the motor 151 for moving the ribbon 140. The first position detector may be constituted by the wiper arm 205, the bus bar 206, and the contacts 207 of FIG. 9. The second position detector D2 may comprises switch 155b, and the fourth position detector D4 may comprise switch 155a. The other elements of FIG. 10 can be the same as for the embodiment of FIG. 4.

In the above-described embodiment, the carriage 50 is moved while the magazine 20 remains stationary. However, it is instead possible for the carriage 50 to be stationary and for the magazine 20 to move back and forth to position a disc 1 to be played in front of the carriage 50 where it can be accessed by a disc loading mechanism.

What is claimed is:

1. A changing apparatus for information storage devices comprising:
   storage means for storing a plurality of information storage devices in mutually parallel, overlapping compartments which are sloped with respect to a prescribed plane, the storage means comprising a magazine having a top, a bottom which is parallel to the top, a plurality of parallel compartments which are sloped with respect to the top and bottom, and a front side and a back side, at last one of the front and back sides having an opening formed therein through which an information storage device can be passed;
   information transfer means for transferring information to or from an information storage device;
   means for moving the storage means and the information transfer means relative to one another parallel to an axis in the prescribed plane;
   loading means for moving an information storage device between a compartment in the magazine and a playback position on the information transfer means through the opening in the magazine; and
   holding means for elastically restraining an information storage device in one of the compartments from movement in the direction of either the front side or the back side of the magazine, the holding means comprising a leaf spring secured to the inside of one of the compartments and having a first portion deformable to permit an information storage device to be withdrawn from the compartment in the direction of the front side of the magazine and a second portion deformable to permit an information storage device to be withdrawn from the compartment in the direction of the back side of the magazine.

2. A changing apparatus for information storage devices comprising:

storage means for storing a plurality of information storage devices in mutually parallel, overlapping compartments which are sloped with respect to a prescribed plane, the storage means comprising a magazine having a top, a bottom which is parallel to the top, a plurality of parallel compartments which are sloped with respect to the top and bottom, and a front side and a back side, at least one of the front and back sides having an opening formed therein through which an information storage device can be passed;

information transfer means for transferring information to or from an information storage device;

means for moving the storage means and the information transfer means relative to one another parallel to an axis in the prescribed plane;

a housing having a recess into which the magazine can be inserted;

locking means for preventing the magazine from being removed from the housing, the locking means comprising a recess which is formed in the magazine and a latch which is rotatably connected to the housing and which can rotate between a latched position in which it engages with the recess in the magazine and an unlatched position in which the magazine can be removed from the recess in the housing; and loading means for moving an information storage device between a compartment in the magazine and a playback position on the information transfer means through the opening in the magazine.

3. A changing apparatus as claimed in claim 2 wherein the latch and the recess in the magazine having cooperating surfaces for pushing the magazine out of the recess in the housing when the latch rotates to its unlatched position.

4. A changing apparatus for information storage devices comprising:

storage means for storing a plurality of information storage devices in mutually parallel, overlapping compartments which are sloped with respect to a prescribed plane;

information transfer means for transferring information to or from an information storage device;

means for moving the storage means and the information transfer means relative to one another parallel to an axis in the prescribed plane; and loading means for moving an information storage device between a compartment in the storage means and a playback position on the information transfer means, the loading means comprising:

a first transfer member mounted on the storage means for movement between a first position and a second position to transfer an information storage device from a compartment of the storage means to the playback position;

biasing means for biasing the first transfer member towards the second position; and a latch for latching the first transfer member in its first position.

5. A changing apparatus as claimed in claim 4 wherein the first transfer member comprises a first lever pivotably mounted on the storage means for engaging with an information storage device in a compartment of the storage means as the first lever pivots from its first position to its second position to push the information storage device from the compartment to the playback position.

6. A changing apparatus as claimed in claim 5 wherein the latch is mounted on the storage means for movement between a locked position in which it locks the first lever in its first position and an unlocked position in which it permits the first lever to pivot to its second position.

7. A changing apparatus as claimed in claim 4 further comprising support means for supporting the information transfer means, wherein the loading means further comprises a second transfer member mounted on the support means for movement between a first position and a second position to transfer an information storage device from the playback position to a compartment of the storage means.

8. A changing apparatus as claimed in claim 7 wherein the second transfer member comprises a second lever pivotably mounted on the support means for engaging with an information storage device in the playback position as the second lever pivots from its first position to its second position to push the information storage device from the playback position into a compartment of the storage means.

9. A changing apparatus as claimed in claim 8 wherein the latch is mounted on the storage means for movement between a locked position in which it locks the first lever in its first position and an unlocked position in which it permits the first lever to pivot to its unlocked position when the second lever is in its second position.

10. A changing apparatus for information storage devices comprising:

storage means for storing a plurality of information storage devices in mutually parallel, overlapping compartments which are sloped with respect to a prescribed plane;

information transfer means for transferring information to or from an information storage device;

means for moving the storage means and the information transfer means relative to one another parallel to an axis in the prescribed plane; and loading means for moving an information storage device between a compartment in the storage means and a playback position on the information transfer means, the loading means comprising:

a latch mounted on the storage means for preventing an information storage device from being pulled out of a compartment of the storage means by gravity;

support means for supporting the information transfer means; and a transfer member mounted on the support means for movement between a first position and a second position to transfer an information storage device from the playback position to a compartment of the storage means.

11. A changing apparatus as claimed in claim 10 wherein the transfer member comprises a lever pivotably mounted on the support means for engaging with an information storage device in the playback position as the lever pivots from its first position to its second position to push the information storage device from the playback position into a compartment of the storage means.

12. A changing apparatus as claimed in claim 11 further comprising means for moving the latch to an unlocked position in which an information storage device can be pulled out of a compartment of the storage means by gravity when the lever is in its second position.

13. A disc changing apparatus comprising:
  a housing;
  a magazine located in the housing and having parallel, overlapping, sloped compartments for storing discs;
  a carriage mounted in the housing adjacent a side of the magazine for movement alongside the magazine to positions opposite the compartments;
  a playback mechanism mounted on the carriage;
  a plurality of first levers mounted on the magazine, each of the first levers being associated with one of the compartments and being pivotable between a first position and a second position to push a disc from inside the corresponding compartment onto the carriage, each of the first levers being biased towards the second position; and
  a plurality of latches mounted on the magazine, each of the latches being associated with one of the first levers and being movable between a locked position in which it locks the corresponding first lever in its first position and an unlocked position in which it enables the corresponding first lever to pivot to its second position.

14. A disc changing apparatus as claimed in claimed in claim 13 further comprising:
  a disc guide mounted on the carriage for supporting a disc as the disc is moved from the magazine onto the carriage by the loading means, the disc guide being movable between a first position in which a disc supported by the disc guide is aligned with a compartment of the magazine and a second position in which a disc supported by the disc guide is mounted on the playback mechanism.

15. A disc changing apparatus as claimed in claim 14 wherein the disc guide comprises:
  a pair of parallel guides pivotably mounted on the carriage for supporting the edges of a disc.

16. A disc changing apparatus as claimed in claim 14 wherein the disc guide comprises:
  a pair of flexible plates each having a first end that is secured to the carriage and a second end;
  a pair of flanges for guiding the edges of a disc, each of the flanges being secured to the second end of one of the flexible plates.

17. A disc changing apparatus comprising:
  a housing;
  a magazine located in the housing and having parallel, overlapping, sloped compartments for storing discs;
  a carriage mounted in the housing below the magazine adjacent a side of the magazine for movement alongside the magazine to positions opposite the compartments;
  a playback mechanism mounted in the carriage;
  a plurality of latches mounted on the magazine, each of the latches being associated with one of the compartments and being movable between a locked position in which it supports the weight of a disc disposed in the corresponding compartment and an unlocked position in which the disc can be withdrawn from the compartment by gravity; and
  a transfer member mounted on the carriage for movement between a first position and a second position to lower a disc from a compartment of the magazine onto the carriage.

18. A disc changing apparatus comprising;
  a housing;
  a magazine located in the housing and having parallel, overlapping, sloped compartments for storing discs;
  a carriage mounted in the housing below the magazine adjacent a side of the magazine for movement alongside the magazine to positions opposite the compartments;
  a playback mechanism mounted on the carriage;
  a latch mounted on the magazine and corresponding to one of the compartments and being movable between a locked position in which it prevents the downward movement of a disc in the corresponding compartment and an unlocked position in which the disc can be withdrawn by gravity from the corresponding compartment; and
  latch operating means for moving the latch to its unlocked position when the carriage is located opposite the corresponding compartment.

19. A disc changing apparatus as claimed in claim 18 wherein the latch supports the weight of a disc in the corresponding compartment when the latch is in its locked position.

20. A disc changing apparatus as claimed in claim 18 wherein when the latch is in its unlocked position, the only force tending to withdraw a disc from the corresponding compartment is gravity.

* * * * *

UNITED STATES PATENT AND TRADEMARK OFFICE
CERTIFICATE OF CORRECTION

PATENT NO.   : 5,136,562
DATED        : August 4, 1992
INVENTOR(S)  : Marcel Staar It is certified that error appears in the above-identified patent and that said Letters Patent is hereby corrected as shown below:

Title page, item [56], "OTHER PUBLICATIONS" should be deleted.

Claim 1, col. 12, line 52, change "last" to --least--;

Claim 6, col. 14, line 17, delete ",";

Claim 9, col. 14, line 41, before "unlocked" insert --second position, further comprising means for moving the latch to its--.

Signed and Sealed this

Fourteenth Day of September, 1993

Attest:

BRUCE LEHMAN

*Attesting Officer*   *Commissioner of Patents and Trademarks*